United States Patent [19]

Zuber

[11] Patent Number: 4,459,254

[45] Date of Patent: Jul. 10, 1984

[54] TRANSPORT SYSTEM FOR HOT MELT

[75] Inventor: Bretislav P. Zuber, Montreal, Canada

[73] Assignee: Northern Telecom Limited, Montreal, Canada

[21] Appl. No.: 104,140

[22] Filed: Dec. 17, 1979

[51] Int. Cl.³ .............................................. B29C 29/00
[52] U.S. Cl. .................................... 264/143; 198/500;
264/37; 264/DIG. 69; 425/217
[58] Field of Search ................ 198/500, 580; 425/216,
425/217; 264/37, 130, 143, 144, 213; 241/97

[56] References Cited

U.S. PATENT DOCUMENTS 2,995,775  8/1961  Schnitzius et al. ................. 425/217
3,433,859  3/1969  Ban ..................................... 264/37 X Primary Examiner—Jeffrey V. Nase

[57] ABSTRACT

A method and apparatus for reclaiming a spew of hot melt thermoplastic material from an extruder head, in which granules of the termoplastic material are spread onto an endless conveyor belt to form a layer on the belt, the spew is fed from the extruder head onto the layer of granules, and both the spew and the granules are fed into a granulator.

1 Claim, 1 Drawing Figure

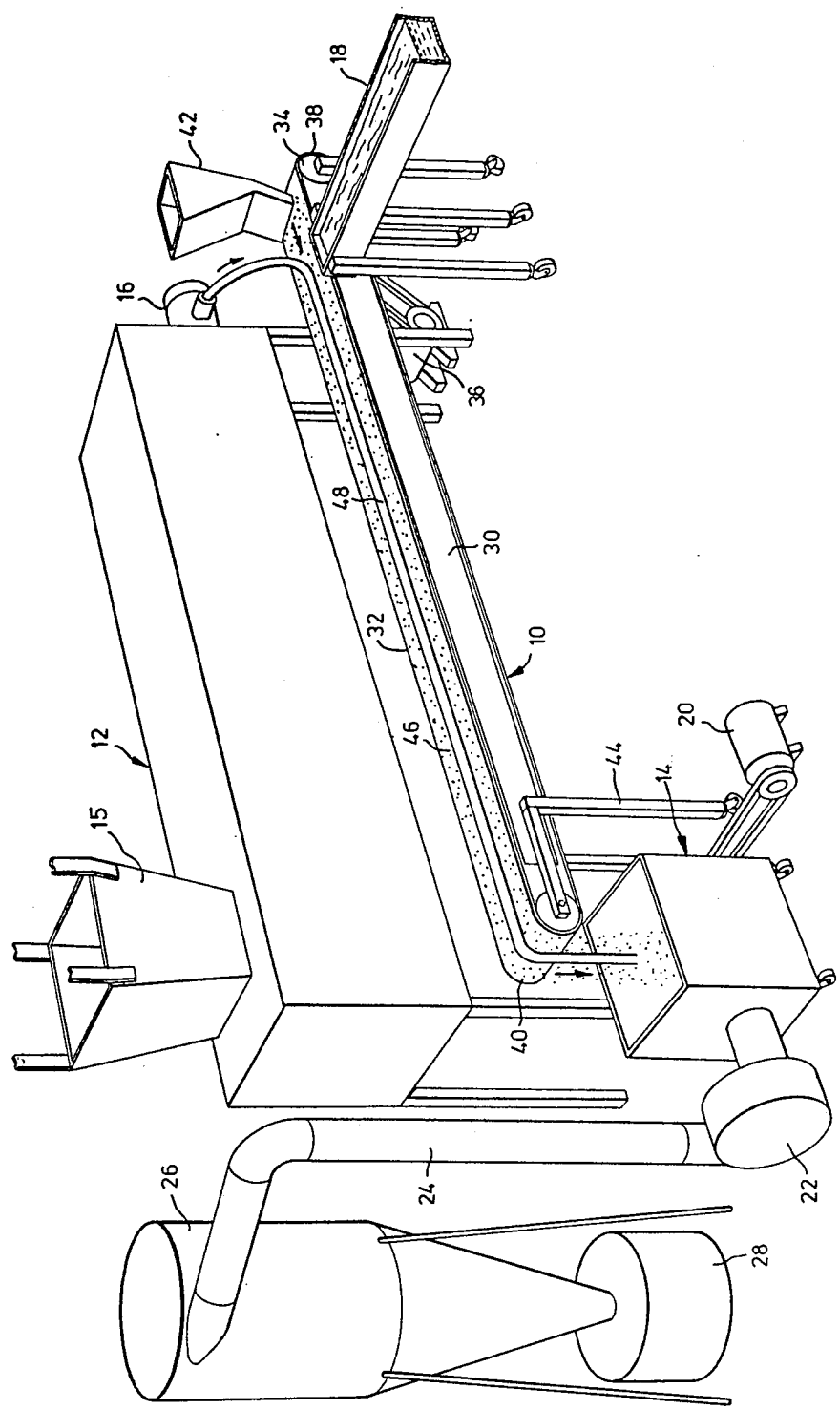

TRANSPORT SYSTEM FOR HOT MELT

FIELD OF THE INVENTION

This invention relates to the operation of an extruder of thermoplastic material such as polyethylene or polyvinylchloride.

BACKGROUND OF THE INVENTION

To start up an extruder it is necessary first to run it in a warm-up. Because the plastic material is relatively expensive it is customary to granulate the spew as it emerges from the extruder head during the warm-up and recycle it into the extruder. In order to allow the spew to cool and solidify before it reaches the granulator it is fed onto a conveyor belt from the extruder head and travels along the conveyer belt which deposits it into the granulator where it is chopped up for re-use.

Recycled plastic material must be free of impurities and this is difficult to achieve with spew because the molten plastic tends to adhere to the conveyer belt and pick up foreign material of the belt as well as damaging it. Various materials have been used to coat the conveyor belt but with limited success and/or uneconomical cost.

It is an object of the present invention to provide an improved method and apparatus for conveying hot melt plastic material from an extruder to a granulator.

SUMMARY OF THE INVENTION

Essentially the invention consists of a method of reclaiming hot melt thermoplastic material from an extruder head comprising the steps of: spreading granules of the plastic material onto the endless belt of a conveyor to form a layer on the belt, the temperature of the granules being sufficiently lower than the temperature of the spew to avoid adherence of the granules to the belt; feeding the spew of the thermoplastic material from the extruder head onto the layer of granules; feeding the spew and the granules from the conveyor belt into a granulator.

In another aspect the invention consists of apparatus for reclaiming a spew of hot melt thermoplastic material from an extruder head, using a granulator, comprising: a conveyer having an endless belt with an upstream end and a downstream end, the granulator being located at the downstream end of the belt and the extruder head being located upstream therefrom; and means to feed granules of the thermoplastic material onto the belt of the conveyor upstream from the extruder head to form a layer on the belt whereby the spew deposited on the belt will be conducted to the granulator out of contact with the belt.

DESCRIPTION OF THE DRAWINGS

An example embodiment of the invention is shown in the accompanying drawing in which:

FIG. 1 shows a perspective view of a spew reclaiming apparatus.

DESCRIPTION OF PREFERRED EMBODIMENT

In the example embodiment a conveyor 10 is interposed between an extruder 12 and a granulator 14. Extruder 12 is fed by a hopper 15 and has a head 16 which may be aligned with a trough 18 for use in jacketing a cable. Granulator 14, driven by a motor 20, is connected by a blower 22 through a duct 24 to a cyclone separator 26 feeding into a collector 28.

Conveyor 10 comprises a frame 30 on which an endless conveyor belt 32 is driven on journalled rollers 34 by suitable drive means 36. Conveyor belt 32 is positioned to have head 16 of extruder 12 located adjacent one end 38 of the belt and to have granulator 14 located beneath the other end 40 of the belt. At end 38 of belt 32 a spreader 42 is located above the belt. Frame 10 is supported on castored legs 44.

In operation extruder 10 is started up and at the same time the operations of conveyor 10, granulator 14 and cyclone separator 26 are initiated. Granulated plastic of the same type as that issuing from the extruder is fed through spreader 42 onto belt 32 in sufficient quantity to form a layer of granules 46 on the belt. Spew 48 is then extruded from head 16 onto belt 32 as seen in the drawing, the spew lying on granules 46 and out of contact with the belt itself. Belt 32 carries spew 48 along conveyor 10 until it drops off end 40 of the belt into granulator 14 along with granules 46. Granulator 14 chops up spew 48 and passes the particles, together with granules 46 dropping into the granulator from the end of the conveyor, by blower 22 to cyclone separator 26 which cools the granules and passes them to collector 28. From collector 28 the granules are recycled into hopper 15 of extruder 12 and hopper 42 of conveyor 10. For proper operation the speed of conveyor belt 32 should be about the same as the speed of extrusion of spew 48 from head 16, and both speeds should be adjusted to the receiving capacity of granulator 14.

When extruder 12 has been heated to operating temperature conveyor 10, including spreader 42, is preferably moved away from the area of the extruder to provide additional operating room.

It will be appreciated that the provision of granules 46, forming a layer on conveyor belt 32, keeps hot spew 48 out of contact with the belt and prevents the spew from damaging the belt surface by adherence with resulting contamination of the spew itself. Granules 46, being at ambient temperature, do not adhere to belt 32.

I claim:

1. A method of reclaiming a spew of hot melt thermoplastic material from an extruder head comprising the steps of:
    spreading granules of the plastic material onto the endless belt of a conveyor to form a layer on the belt, the temperature of the granules being sufficiently lower than the temperature of the spew to avoid adherence of the granules to the belt;
    feeding the spew of the thermoplastic material from the extruder head onto the layer of granules; and
    feeding the spew and the granules from the conveyor belt into a granulator.

* * * * *